US012729164B2

(12) United States Patent
Sakon et al.

(10) Patent No.: US 12,729,164 B2
(45) Date of Patent: Sep. 8, 2026

(54) CUBIC BORON NITRIDE SINTERED MATERIAL AND TOOL

(71) Applicants: SUMITOMO ELECTRIC HARDMETAL CORP., Hyogo (JP); SUMITOMO ELECTRIC INDUSTRIES, LTD., Osaka (JP)

(72) Inventors: Ryosuke Sakon, Hyogo (JP); Yuya Kishida, Osaka (JP); Yu Kawamura, Osaka (JP); Yusuke Matsuda, Hyogo (JP); Machiko Abe, Osaka (JP); Hironari Moroguchi, Osaka (JP); Akito Ishii, Osaka (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 19/100,602

(22) PCT Filed: Sep. 2, 2024

(86) PCT No.: PCT/JP2024/031457
§ 371 (c)(1),
(2) Date: Feb. 3, 2025

(87) PCT Pub. No.: WO2026/048050
PCT Pub. Date: Mar. 5, 2026

(65) Prior Publication Data

US 2026/0062355 A1 Mar. 5, 2026

(51) Int. Cl.
*C04B 35/5831* (2006.01)

(52) U.S. Cl.
CPC .. *C04B 35/5831* (2013.01); *C04B 2235/3217* (2013.01); *C04B 2235/3813* (2013.01);
(Continued)

(58) Field of Classification Search
None
See application file for complete search history.

(56) References Cited

U.S. PATENT DOCUMENTS 5,328,875 A * 7/1994 Ueda .................. C04B 35/5831 501/87
6,316,094 B1 * 11/2001 Fukaya .............. C04B 35/5831 428/404
(Continued)

FOREIGN PATENT DOCUMENTS

JP 2000044347 A 2/2000
JP 2002302732 A 10/2002
(Continued)

*Primary Examiner* — Amber R Orlando
*Assistant Examiner* — Paul Alan Forsyth
(74) *Attorney, Agent, or Firm* — Renner, Otto, Boisselle & Sklar, LLP

(57) ABSTRACT

A cubic boron nitride sintered material includes: 40 to 80 volume % of cubic boron nitride grains; and 20 to 60 volume % of a binder phase, wherein an average grain size d of the cubic boron nitride grains is 0.1 to 3 μm, the binder phase includes at least one selected from a second group consisting of a simple substance of one element selected from a first group, an alloy consisting of two or more elements selected from the first group, and an intermetallic compound consisting of two or more elements selected from the first group, or at least one selected from a fourth group consisting of a first compound and a solid solution originated from the first compound, and in a cross section of the cubic boron nitride sintered material, a variation coefficient Z of an area ratio of the cubic boron nitride grains is 0.25 or less.

7 Claims, 1 Drawing Sheet

(52) U.S. Cl.
CPC ................. *C04B 2235/3865* (2013.01); *C04B 2235/3886* (2013.01); *C04B 2235/786* (2013.01)

(56) References Cited

U.S. PATENT DOCUMENTS

| | | | | |
|---|---|---|---|---|
| 2009/0080986 | A1* | 3/2009 | Can ....................... | C22C 1/1084 51/307 |
| 2021/0213539 | A1 | 7/2021 | Iida et al. | |
| 2022/0144709 | A1* | 5/2022 | Momma ............... | C04B 35/645 |
| 2023/0249261 | A1 | 8/2023 | Isobe et al. | |
| 2024/0318286 | A1 | 9/2024 | Yano | |

FOREIGN PATENT DOCUMENTS

| | | | |
|---|---|---|---|
| JP | 2008517868 | A | 5/2008 |
| JP | 2013234335 | A | 11/2013 |
| JP | 2018052781 | A | 4/2018 |
| WO | 2006046124 | A1 | 5/2006 |
| WO | 2020175598 | A1 | 9/2020 |
| WO | 2021024737 | A1 | 2/2021 |
| WO | 2022004530 | A1 | 1/2022 |
| WO | 2022168655 | A1 | 8/2022 |

* cited by examiner

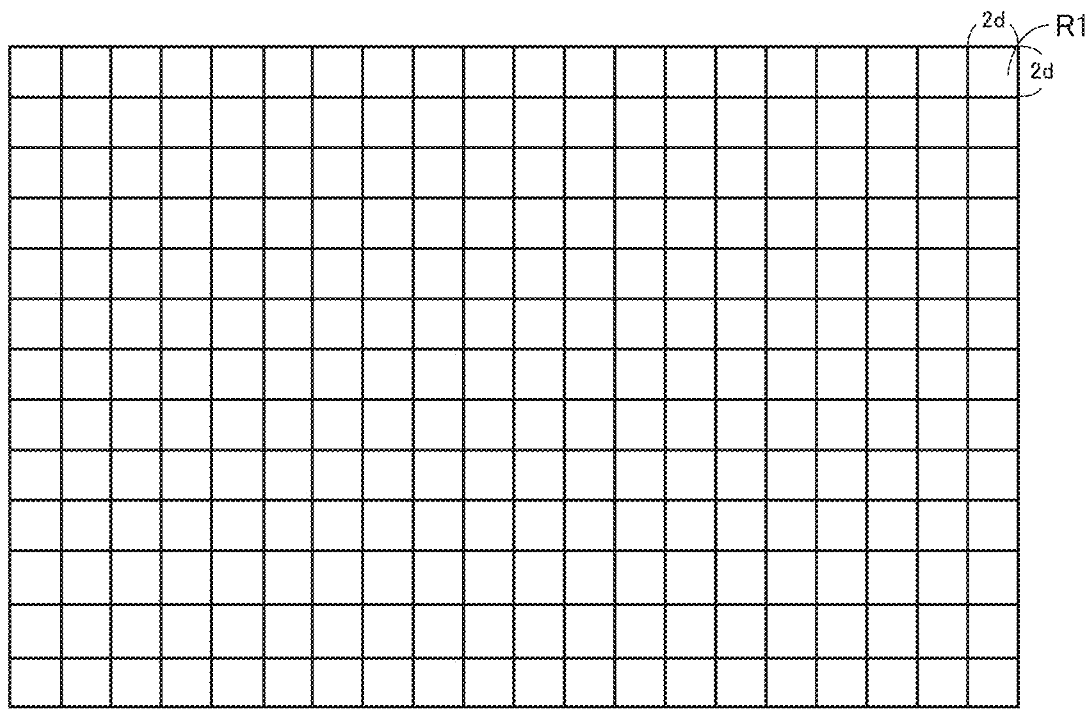
2d
R1
2d

CUBIC BORON NITRIDE SINTERED MATERIAL AND TOOL

This application is a national phase of International Application No. PCT/JP2024/031457 filed Sep. 2, 2024, which is hereby incorporated herein by reference in its entirety.

TECHNICAL FIELD

The present disclosure relates to a cubic boron nitride sintered material and a tool.

BACKGROUND ART

Conventionally, a cubic boron nitride sintered material has been used as a material of a tool such as a cutting tool (PTL 1 to PTL 3).

CITATION LIST

Patent Literature

PTL 1: Japanese Patent Laying-Open No. 2000-44347
PTL 2: Japanese Patent Laying-Open No. 2002-302732
PTL 3: Japanese Patent Laying-Open No. 2013-234335

SUMMARY OF INVENTION

A cubic boron nitride sintered material of the present disclosure is a cubic boron nitride sintered material including: 40 volume % or more and 80 volume % or less of cubic boron nitride grains; and 20 volume % or more and 60 volume % or less of a binder phase, wherein an average grain size d of the cubic boron nitride grains is 0.1 μm or more and 3 μm or less, the binder phase includes at least one selected from a second group consisting of a simple substance of one element selected from a first group consisting of a group 4 element, a group 5 element, a group 6 element in a periodic table, and aluminum, an alloy consisting of two or more elements selected from the first group, and an intermetallic compound consisting of two or more elements selected from the first group, or at least one selected from a fourth group consisting of a first compound and a solid solution originated from the first compound, the first compound consisting of at least one element selected from the first group and at least one element selected from a third group consisting of nitrogen, carbon, boron, and oxygen, in a cross section of the cubic boron nitride sintered material, a variation coefficient Z of an area ratio of the cubic boron nitride grains is 0.25 or less, and the variation coefficient Z is obtained by providing 260 unit regions in total in an image obtained through binarization processing on a reflected electron image obtained by imaging the cross section of the cubic boron nitride sintered material at a magnification of 5,000 times with a scanning electron microscope, calculating a standard deviation of respective area ratios of the cubic boron nitride grains in the unit regions and an average of the area ratios based on the 260 unit regions in total, and dividing the standard deviation by the average, each of the unit regions having a square shape with each side having a length twice as large as the average grain size d of the cubic boron nitride grains.

BRIEF DESCRIPTION OF DRAWINGS

FIG. 1 is an image diagram showing 260 unit regions in total in an image (second image) obtained through binarization processing on a reflected electron image (first image) of one cross section of a cubic boron nitride sintered material.

DETAILED DESCRIPTION

Problem to be Solved by the Present Disclosure

In recent years, a demand for strong intermittent cutting has been increased further. Therefore, there has been required a cubic boron nitride sintered material allowing for a long life of a tool even when particularly used as a material of a cutting tool for strong intermittent cutting.

Thus, it is an object of the present disclosure to provide: a cubic boron nitride sintered material allowing for a long life of a tool even when particularly used as a material of a cutting tool for strong intermittent cutting; and a tool including the cubic boron nitride sintered material.

Advantageous Effect of the Present Disclosure

According to the present disclosure, it is possible to provide: a cubic boron nitride sintered material allowing for a long life of a tool even when particularly used as a material of a cutting tool for strong intermittent cutting; and a tool including the cubic boron nitride sintered material.

DESCRIPTION OF EMBODIMENTS

First, embodiments of the present disclosure will be listed and described.

(1) A cubic boron nitride sintered material of the present disclosure is a cubic boron nitride sintered material including: 40 volume % or more and 80 volume % or less of cubic boron nitride grains; and 20 volume % or more and 60 volume % or less of a binder phase, wherein an average grain size d of the cubic boron nitride grains is 0.1 μm or more and 3 μm or less, the binder phase includes at least one selected from a second group consisting of a simple substance of one element selected from a first group consisting of a group 4 element, a group 5 element, a group 6 element in a periodic table, and aluminum, an alloy consisting of two or more elements selected from the first group, and an intermetallic compound consisting of two or more elements selected from the first group, or at least one selected from a fourth group consisting of a first compound and a solid solution originated from the first compound, the first compound consisting of at least one element selected from the first group and at least one element selected from a third group consisting of nitrogen, carbon, boron, and oxygen, in a cross section of the cubic boron nitride sintered material, a variation coefficient Z of an area ratio of the cubic boron nitride grains is 0.25 or less, and the variation coefficient Z is obtained by providing 260 unit regions in total in an image obtained through binarization processing on a reflected electron image obtained by imaging the cross section of the cubic boron nitride sintered material at a magnification of 5,000 times with a scanning electron microscope, calculating a standard deviation of respective area ratios of the cubic boron nitride grains in the unit regions and an average of the area ratios based on the 260 unit regions in total, and dividing the standard deviation by the average, each of the unit regions having a square shape with each side having a length twice as large as the average grain size d of the cubic boron nitride grains.

According to the present disclosure, it is possible to provide: a cubic boron nitride sintered material allowing for a long life of a tool even when particularly used as a material of a cutting tool for strong intermittent cutting; and a tool including the cubic boron nitride sintered material.

(2) In (1), the average grain size d of the cubic boron nitride grains may be 0.1 μm or more and 2 μm or less. Thus, it is possible to provide a cubic boron nitride sintered material allowing for a longer tool life of a cutting tool even when particularly used as a material of a cutting tool for strong intermittent cutting; and a tool including the cubic boron nitride sintered material.

(3) In (1) or (2), a content ratio of the cubic boron nitride grains in the cubic boron nitride sintered material may be 60 volume % or more and 70 volume % or less, and a content ratio of the binder phase in the cubic boron nitride sintered material may be 30 volume % or more and 40 volume % or less. Thus, it is possible to provide: a cubic boron nitride sintered material allowing for a longer tool life of a cutting tool even when particularly used as a material of a cutting tool for strong intermittent cutting; and a tool including the cubic boron nitride sintered material.

(4) In any of (1) to (3), the binder phase may include at least one selected from a group consisting of titanium nitride, titanium boride, aluminum nitride, and aluminum oxide. Thus, it is possible to provide: a cubic boron nitride sintered material allowing for a longer tool life of a cutting tool even when particularly used as a material of a cutting tool for strong intermittent cutting; and a tool including the cubic boron nitride sintered material.

(5) In any of (1) to (4), a total content ratio of the cubic boron nitride grains and the binder phase in the cubic boron nitride sintered material may be 99 volume % or more. Thus, it is possible to provide: a cubic boron nitride sintered material allowing for a longer tool life of a cutting tool even when particularly used as a material of a cutting tool for strong intermittent cutting; and a tool including the cubic boron nitride sintered material.

(6) A tool of the present disclosure includes the cubic boron nitride sintered material according to any of (1) to (5).

According to the present disclosure, it is possible to provide a tool including a cubic boron nitride sintered material allowing for a long life of the tool even when particularly used as a material of a cutting tool for strong intermittent cutting.

Details of Embodiments of the Present Disclosure

With reference to figures, the following describes specific examples of a cubic boron nitride sintered material and a tool according to one embodiment (hereinafter, also referred to as "the present embodiment") of the present disclosure. In the figures of the present disclosure, the same reference characters represent the same or corresponding portions. Further, a dimensional relation such as a length, a width, a thickness, or a depth is appropriately changed for clarity and simplification of the figures, and therefore do not necessarily represent an actual dimensional relation.

In the present disclosure, the expression "A to B" represents a range of lower to upper limits (i.e., A or more and B or less), and when no unit is indicated for A and a unit is indicated only for B, the unit of A is the same as the unit of B.

When a compound or the like is expressed by a chemical formula in the present disclosure and an atomic ratio is not particularly limited, it is assumed that all the conventionally known atomic ratios are included, and the atomic ratio should not be necessarily limited only to one in the stoichiometric range.

First Embodiment: Cubic Boron Nitride Sintered Material

A cubic boron nitride sintered material according to one embodiment of the present disclosure will be described with reference to FIG. 1. FIG. 1 is an image diagram showing 260 unit regions in total in an image (second image) obtained through binarization processing on a reflected electron image (first image) of one cross section of a cubic boron nitride sintered material.

One embodiment (hereinafter, also referred to as "the present embodiment") of the present disclosure is directed to a cubic boron nitride sintered material including: 40 volume % or more and 80 volume % or less of cubic boron nitride grains; and 20 volume % or more and 60 volume % or less of a binder phase, wherein an average grain size d of the cubic boron nitride grains is 0.1 μm or more and 3 μm or less, the binder phase includes at least one selected from a second group consisting of a simple substance of one element selected from a first group consisting of a group 4 element, a group 5 element, a group 6 element in a periodic table, and aluminum, an alloy consisting of two or more elements selected from the first group, and an intermetallic compound consisting of two or more elements selected from the first group, or at least one selected from a fourth group consisting of a first compound and a solid solution originated from the first compound, the first compound consisting of at least one element selected from the first group and at least one element selected from a third group consisting of nitrogen, carbon, boron, and oxygen, in a cross section of the cubic boron nitride sintered material, a variation coefficient Z of an area ratio of the cubic boron nitride grains is 0.25 or less, and variation coefficient Z is obtained by providing 260 unit regions R1 in total in an image obtained through binarization processing on a reflected electron image obtained by imaging the cross section of the cubic boron nitride sintered material at a magnification of 5,000 times with a scanning electron microscope, calculating a standard deviation of respective area ratios of the cubic boron nitride grains in unit regions R1 and an average of the area ratios based on 260 unit regions R1 in total, and dividing the standard deviation by the average, each of the unit regions having a square shape with each side having a length twice as large as the average grain size d of the cubic boron nitride grains.

According to the present disclosure, it is possible to provide: a cubic boron nitride sintered material allowing for a long life of a tool even when particularly used as a material of a cutting tool for strong intermittent cutting; and a tool including the cubic boron nitride sintered material. A reason therefor is presumed as follows.

The cubic boron nitride sintered material according to the present embodiment is a cubic boron nitride sintered material including: 40 volume % or more and 80 volume % or less of cubic boron nitride grains; and 20 volume % or more and 60 volume % or less of a binder phase, wherein an average grain size d of the cubic boron nitride grains is 0.1 μm or more and 3 μm or less, and in a cross section of the cubic boron nitride sintered material, a variation coefficient Z of an area ratio of the cubic boron nitride grains is 0.25 or less. Thus, in the cubic boron nitride sintered material, the cubic boron nitride grains are likely to be sufficiently uniformly dispersed. As a result, a "region that is likely to become a starting point of breakage due to presence of a relatively large amount of binder phase" is less likely to be formed, with the result that the cubic boron nitride sintered material can have excellent strength. Therefore, even when the cubic boron nitride sintered material according to the present embodiment is particularly used as a material of a cutting tool for strong intermittent cutting, breakage resistance of the tool can be improved and the life of the tool can be long.

<<Composition of Cubic Boron Nitride Sintered Material>

The cubic boron nitride sintered material includes 40 volume % or more and 80 volume % or less of the cubic boron nitride grains. From the viewpoint of improving the breakage resistance, the lower limit of the content ratio of the cubic boron nitride grains is 40 volume % or more, may be 50 volume % or more, or may be 60 volume % or more. From the viewpoint of improving sinterability, the upper limit of the content ratio of the cubic boron nitride grains is 80 volume % or less, may be 75 volume % or less, or may be 70 volume % or less. The content ratio of the cubic boron nitride grains may be 50 volume % or more and 75 volume % or less, or may be 60 volume % or more and 70 volume % or less.

The cubic boron nitride sintered material includes 20 volume % or more and 60 volume % or less of the binder phase. From the viewpoint of improving the sinterability, the lower limit of the content ratio of the binder phase is 20 volume % or more, may be 25 volume % or more, or may be 30 volume % or more. From the viewpoint of improving the breakage resistance, the upper limit of the content ratio of the binder phase in the cubic boron nitride sintered material is 60 volume % or less, may be 50 volume % or less, or may be 40 volume % or less. The content ratio of the binder phase in the cubic boron nitride sintered material may be 25 volume % or more and 50 volume % or less, or may be 30 volume % or more and 40 volume % or less.

In the cubic boron nitride sintered material, the content ratio [volume %] of the cubic boron nitride grains and the content ratio [volume %] of the binder phase can be confirmed by observing the structure of the cubic boron nitride sintered material using a field emission scanning electron microscope (FE-SEM). A specific measurement method is as follows.

The cubic boron nitride sintered material is cut at any position by ion milling so as to expose a cross section of the cubic boron nitride sintered material, and the cross section is polished. In the ion milling, "CrossSectionPolisher" (CP) provided by JEOL is used, an acceleration voltage is set to 5.5 kV, an amount of protrusion is set to 20 μm, and a processing time is set to 5 hours or more. An adhesive agent such as a C paste may be used to fix the cubic boron nitride sintered material. When the cubic boron nitride sintered material is used as a portion of a tool, the portion corresponding to the cubic boron nitride sintered material is cut out by a diamond grindstone electrodeposition wire or the like so as to expose a sample including a cross section of the cubic boron nitride sintered material.

Next, an SEM image is obtained by imaging the cross section at a magnification of 2,000 to 50,000 times with the FE-SEM. Next, a reflected electron image is obtained by using a semiconductor type reflected-electron detector for the SEM image under conditions that the number of pixels is 1024×768 and an acceleration voltage is 1.5 kV. It should be noted that in the reflected electron image, brightness contrast is adjusted such that each of regions in which the cubic boron nitride grains are present is represented by a darkest black region (60 or less in the range of 0 to 255) and each of regions in which the binder phase is present is represented by a gray region or white region (100 or more and 255 or less in the range of 0 to 255). When charge is large, a conductive coating having a thickness of 2 to 10 nm may be applied to the cross section.

Next, binarization processing is performed onto the reflected electron image using image analysis software ("WinROOF 2018" from Mitani Corporation) so as to extract only the cubic boron nitride grains. Since a threshold value for the binarization is changed depending on a contrast, the threshold value is set for each image. An area ratio of pixels originated from the dark field (pixels originated from the cubic boron nitride grains) in the area of a measurement visual field is calculated from the image having been through the binarization processing. The calculated area ratio is regarded as volume %, thereby finding the content ratio [volume %] of the cubic boron nitride grains in the cubic boron nitride sintered material. The pixels originated from the dark field can be confirmed to be originated from the cubic boron nitride grains, by performing an elemental analysis onto the cubic boron nitride sintered material using an energy dispersive X-ray spectrometer (EDX apparatus) accompanied with the SEM.

The content ratio [volume %] of the binder phase in the cubic boron nitride sintered material can be found from the image having been through the binarization processing by calculating the area ratio of the pixels originated from the bright field (pixels originated from the binder phase) in the area of the measurement visual field. The pixels originated from the bright field can be confirmed to be originated from the binder phase, by performing an elemental analysis onto the cubic boron nitride sintered material using the EDX apparatus accompanied with the SEM.

The measurement for the area ratios of the cubic boron nitride grains and the binder phase is performed in each of five measurement visual fields that do not overlap with each other so as to calculate the averages of the area ratios of the cubic boron nitride grains and the binder phase in the five measurement visual fields. In the present disclosure, the average of the area ratios of the cubic boron nitride grains in the five measurement visual fields corresponds to the content ratio [volume %] of the cubic boron nitride grains in the cubic boron nitride sintered material. In the present disclosure, the average of the area ratios of the binder phase in the five measurement visual fields corresponds to the content ratio [volume %] of the binder phase in the cubic boron nitride sintered material.

As long as the applicant has performed the measurement, it has been confirmed that there is almost no variation in the measurement result even when the five measurement visual fields are freely set in the same sample and the measurement of the content ratios of the cubic boron nitride grains and the binder phase in the cubic boron nitride sintered material is performed a plurality of times in accordance with the above procedure.

The total content ratio of the cubic boron nitride grains and the binder phase in the cubic boron nitride sintered material may be 99 volume % or more. Thus, the cubic boron nitride sintered material can sufficiently include a structure in which the cubic boron nitride grains are sufficiently uniformly dispersed, thereby further improving the strength of the cubic boron nitride sintered material. The upper limit of the total content ratio may be 100 volume % or less.

The total content ratio of the cubic boron nitride grains and the binder phase in the cubic boron nitride sintered material can be specified by calculating the sum of the content ratio [volume %] of the cubic boron nitride grains and the content ratio [volume %] of the binder phase.

The cubic boron nitride sintered material may include another phase in addition to the cubic boron nitride grains and the binder phase, as long as the effects of the present disclosure are not impaired. Examples of the other phase include WC and $W_2CoB_2$.

<<Cubic Boron Nitride Grains>>

<Average Grain Size d of Cubic Boron Nitride Grains>

Average grain size d of the cubic boron nitride grains is 0.1 μm or more and 3 μm or less. Thus, the cubic boron nitride grains are likely to be sufficiently uniformly dispersed in the cubic boron nitride sintered material, thereby improving the strength of the cubic boron nitride sintered material. Average grain size d of the cubic boron nitride grains may be 0.1 μm or more and 2 μm or less, or may be 0.1 μm or more and 1 μm or less.

In the present disclosure, average grain size d of the cubic boron nitride grains is measured by the following procedure. First, the second image is obtained in the same manner as in a below-described method of measuring "variation coefficient Z of the area ratio of the cubic boron nitride grains". Next, the second image is subjected to Watershed processing using image analysis software "ImageJ" (trade name) so as to specify a position of a grain boundary between the cubic boron nitride grains in the second image and calculate an arithmetic average of equivalent circle diameters (Heywood diameters; equivalent-area equivalent-circle diameters) of the cubic boron nitride grains. It should be noted that, here, the cubic boron nitride grains in the image include a cubic boron nitride grain at an end of the image.

The above measurement is performed in each of five measurement visual fields that do not overlap with each other. The arithmetic average of the average grain sizes of the cubic boron nitride grains in the five measurement visual fields is calculated. In the present disclosure, the arithmetic average of the average grain sizes of the five measurement visual fields corresponds to average grain size d of the cubic boron nitride grains.

As long as the applicant has performed the measurement, it has been confirmed that there is almost no variation in the measurement result even when the five measurement visual fields are freely set in the same sample and the measurement of average grain size d of the cubic boron nitride grains is performed a plurality of times in accordance with the above procedure.

<Variation Coefficient Z of Area Ratio of Cubic Boron Nitride Grains>

In the cross section of the cubic boron nitride sintered material, variation coefficient Z of the area ratio of the cubic boron nitride grains is 0.25 or less. Thus, the strength of the cubic boron nitride sintered material can be improved. In the cross section of the cubic boron nitride sintered material, the upper limit of variation coefficient Z of the area ratio of the cubic boron nitride grains may be 0.24 or less, 0.23 or less, or 0.22 or less. In the cross section of the cubic boron nitride sintered material, the lower limit of variation coefficient Z of the area ratio of the cubic boron nitride grains is not particularly limited, but may be 0 or more, 0.1 or more, 0.20 or more, or 0.21 or more. In the cross section of the cubic boron nitride sintered material, variation coefficient Z of the area ratio of the cubic boron nitride grains may be 0 or more and 0.25 or less, may be 0.1 or more and 0.24 or less, or may be 0.20 or more and 0.23 or less.

A method of finding variation coefficient Z of the area ratio of the cubic boron nitride grains in the cross section of the cubic boron nitride sintered material will be described. First, 260 square unit regions R1, each of which has each side having a length twice as large as average grain size d of the cubic boron nitride grains, are provided in total in the image (second image) obtained through the binarization processing on the reflected electron image (first image) obtained by imaging the cross section of the cubic boron nitride sintered material at the magnification of 5,000 with the scanning electron microscope (FIG. 1). Next, the standard deviation of the respective area ratios of the cubic boron nitride grains in unit regions R1 and the average (arithmetic average) of the area ratios are calculated based on 260 unit regions R1 in total, and the standard deviation is divided by the average (arithmetic average), thereby obtaining variation coefficient Z. More specifically, the reflected electron image is set to have a size of 300 $\mu m^2$, and is captured at a contrast at which the cubic boron nitride grains and the binder phase can be clearly distinguished from each other. The binarization processing is performed by performing, using a program written in Python, binarization between the region of the cubic boron nitride grains and the other region. It should be noted that in one second image, unit regions R1 are continuously arranged along each of a first direction and a direction orthogonal to the first direction. The number of unit regions R1 in one second image is the maximum number of unit regions R1 that can be provided in the second image. When the number of unit regions R1 is less than 260 in only one second image, unit regions R1 are provided in another second image such that the total number of unit regions R1 becomes 260. When there is a second image with a surplus in the number of unit regions R1, the total number of unit regions R1 is adjusted to be 260 by selecting any unit regions R1 in the second image.

As long as the applicant has performed the measurement, it has been confirmed that there is almost no variation in the measurement result even when the measurement visual fields are freely set in the same sample and the measurement of variation coefficient Z of the area ratio of the cubic boron nitride grains is performed a plurality of times in accordance with the above procedure.

<<Binder Phase>>

<Composition of Binder Phase>

The binder phase includes at least one selected from a second group consisting of a simple substance of one element selected from a first group consisting of a group 4 element, a group 5 element, a group 6 element in a periodic table, and aluminum, an alloy consisting of two or more elements selected from the first group, and an intermetallic compound consisting of two or more elements selected from the first group, or at least one selected from a fourth group consisting of a first compound and a solid solution originated from the first compound, the first compound consisting of at least one element selected from the first group and at least one element selected from a third group consisting of nitrogen, carbon, boron, and oxygen. Thus, the binder phase can have excellent binding force for the cubic boron nitride grains, thereby improving breakage resistance of a tool even when the cubic boron nitride sintered material according to the present embodiment is particularly used as a material of a cutting tool for strong intermittent cutting. The binder phase may include at least one selected from a group consisting of titanium nitride, titanium boride, aluminum nitride, and aluminum oxide. Thus, it is possible to further improve the breakage resistance of the cutting tool even when particularly used as a material of a cutting tool for strong intermittent cutting. The binder phase may include, as a main component, at least one selected from the second group consisting of the simple substance of the one element selected from the first group consisting of the group 4 element, the group 5 element, the group 6 element in the periodic table, and aluminum, the alloy consisting of the two or more elements selected from the first group, and the intermetallic compound consisting of the two or more elements selected from the first group, or at least one selected from the fourth group consisting of the first compound and the solid solution originated from the first compound, the first compound consisting of at least one element selected from the first group and at least one element selected from the third group consisting of nitrogen, carbon, boron, and oxygen. Here, the expression "include as a main component" means that the total content ratio of these components in the binder phase is 90 volume % or more.

In the cubic boron nitride sintered material, the composition of the binder phase can be specified by X-ray diffraction measurement (XRD).

Second Embodiment: Method of Producing Cubic Boron Nitride Sintered Material A method of producing the cubic boron nitride sintered material according to the present embodiment includes a preparation step, a pretreatment step, a mixing step, and a sintering step in this order.

<<Preparation Step>>

In the preparation step, a source material powder is prepared. As the source material powder, cubic boron nitride powder (hereinafter, also referred to as "cBN powder") and a binder phase source material powder are prepared.

The cBN powder is a source material powder for the cubic boron nitride grains included in the cubic boron nitride sintered material. The cBN powder may be produced by adding a catalyst (Li, Ca, Mg, and nitrides, borides, and boronitrides of these) to a hexagonal boron nitride powder and then performing heating and pressing, or a commercially available cBN powder may be prepared. It should be noted that average grain size d of the cubic boron nitride grains included in the cubic boron nitride sintered material depends on the average particle size of the cBN powder. Therefore, by setting the average particle size of the cBN powder to fall within a desired range, average grain size d of the cubic boron nitride grains included in the cubic boron nitride sintered material can fall within a desired range.

The binder phase source material powder includes at least one selected from the second group consisting of the simple substance of the one element selected from the first group consisting of the group 4 element, the group 5 element, the group 6 element in the periodic table, and aluminum, the alloy consisting of the two or more elements selected from the first group, and the intermetallic compound consisting of the two or more elements selected from the first group, or at least one selected from the fourth group consisting of the first compound and the solid solution originated from the first compound, the first compound consisting of at least one element selected from the first group and at least one element selected from the third group consisting of nitrogen, carbon, boron, and oxygen. The binder phase source material powder may be produced by a conventionally known method, or a commercially available binder phase source material powder may be prepared.

<<Pretreatment Step>>

In the pretreatment step, plasma treatment is performed onto each of the cBN powder and the binder phase source material powder. More specifically, the cBN powder is exposed to a gas atmosphere including Ar for 20 minutes or more and 40 minutes or less, and the binder phase source material powder is exposed to a gas atmosphere including $N_2$ for 20 minutes or more and 40 minutes or less. Thus, the particles are less likely to be aggregated in the below-described mixing step, thereby suppressing generation of secondary particles.

<<Mixing Step>>

In the mixing step, the cBN powder having been through the plasma treatment and the binder phase source material powder having been through the plasma treatment are mixed by wet ball mill mixing, thereby obtaining a powder mixture. The wet ball mill mixing is performed by simultaneously using a ball (hereinafter, also referred to as "large-diameter ball") having a diameter of 3 mm or more and 8 mm or less and a ball (hereinafter, also referred to as a "small-diameter ball") having a diameter of 1 mm or more and 2 mm or less. Thus, while secondary particles generated even after the pretreatment step can be pulverized with the large-diameter ball to generate primary particles, the primary particles can be uniformly mixed with the small-diameter ball. Therefore, the particles of the cBN powder can be sufficiently uniformly dispersed. Conventionally, the method of mixing the source material powders by simultaneously using the large-diameter ball and the small-diameter ball has not been employed purposely because time and effort in production are increased. It should be noted that examples of the solvent include ethanol, acetone, and the like.

A ratio M2/M1 of a total mass M2 of the small-diameter ball to a total mass M1 of the large-diameter ball may be 0.26 or more and 0.40 or less.

<<Sintering Step>>

In the sintering step, the powder mixture is sintered to obtain the cubic boron nitride sintered material. More specifically, first, as a first step, the powder mixture is introduced into a container and is vacuum-sealed. Next, as a second step, the vacuum-sealed powder mixture is sintered using an ultra-high temperature and high pressure apparatus.

In the sintering step, a first temperature increase of increasing the temperature to 1200° C. or more and 1300° C. or less and a second temperature increase of increasing the temperature to 1400° C. or more and 1550° C. or less are performed in this order. In the first temperature increase, a temperature increase rate is 8° C./minute or more and 12° C./minute or less. In the second temperature increase, the temperature increase rate is 2° C./minute or more and 5° C./minute or less. Thus, the temperature in the sintering step can be gradually increased, thereby suppressing a heater from being deformed by the temperature increase and suppressing a resistance value of the heater from being increased by the deformation. Therefore, the temperature during the sintering can be controlled to fall within the intended temperature range (i.e., 1400° C. or more and 1550° C. or less).

<<Feature of Method of Producing Cubic Boron Nitride Sintered Material According to the Present Embodiment>>

The above production method is performed by performing the followings in the following order: exposing the cBN powder to the gas atmosphere including Ar for 20 minutes or more and 40 minutes or less and exposing the binder phase source material powder to the gas atmosphere including $N_2$ for 20 minutes or more and 40 minutes or less in the pretreatment step; using the large-diameter ball and the small-diameter ball simultaneously in the mixing step; and performing the first temperature increase (temperature increase rate: 8° C./minute or more and 12° C./minute or less) and the second temperature increase (temperature increase rate: 2° C./minute or more and 5° C./minute or less) in the sintering step. Thus, the particles of the cBN powder can be maintained to be fine and can be sufficiently uniformly dispersed, and the temperature during the sintering can be controlled to fall within the desired range. Therefore, the cubic boron nitride grains can be sufficiently uniformly dispersed in the cubic boron nitride sintered material, with the result that variation coefficient Z of the area ratio of the cubic boron nitride grains can be controlled to fall within the desired range in the cross section of the cubic boron nitride sintered material. As a result of diligent study by the present inventors, it has been found that the cubic boron nitride sintered material of the present disclosure can be realized by employing such a production method.

Third Embodiment: Tool

A tool according to the present embodiment includes the cubic boron nitride sintered material according to the first embodiment.

According to the present disclosure, it is possible to provide a tool including a cubic boron nitride sintered material allowing for a long life of the tool even when particularly used as a material of a cutting tool for strong intermittent cutting. The reason therefor has been described in the first embodiment.

A whole of the tool may be composed of the cubic boron nitride sintered material, or only a portion of the tool (for example, a cutting edge portion in the case of a cutting tool) may be composed of the cubic boron nitride sintered material. Further, a coating film may be formed on a surface of the tool. Examples of the tool include a cutting tool, a wear-resistant tool, and the like.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like.

<<Method of Producing Tool>>

A method of producing the tool according to the present disclosure can be performed in the same manner as in a conventionally known method except that the cubic boron nitride sintered material described in the first embodiment is used.

Examples

The present embodiment will be described more specifically with reference to examples. It should be noted that the present embodiment is not limited by these examples.

<<Production of Cubic Boron Nitride Sintered Material>>

The following steps were performed in the following order to produce each of cubic boron nitride sintered materials according to samples 1 to 17 and 101 to 107.

<Preparation Step>

First, as source material powders, a cBN powder (particle size: the same as d [μm] described in each of Tables 2-1 and 2-2) and a binder phase source material powder (composition: the same as the composition of the binder phase described in each of Tables 2-1 and 2-2) were prepared.

<Pretreatment Step>

Plasma treatment was performed by exposing the cBN powder to a gas atmosphere including Ar under conditions described in each of Tables 1-1 and 1-2, and exposing the binder phase source material powder to a gas atmosphere including $N_2$ under conditions described in each of Tables 1-1 and 1-2. It should be noted that when "0" is described in the column "Ar Gas Exposure Time [Minute]" in each of Tables 1-1 and 1-2, it means that the exposure to the gas atmosphere including Ar was not performed. On the other hand, when "0" is described in the column "$N_2$ Gas Exposure Time [Minute]" in each of Tables 1-1 and 1-2, it means that the exposure to the gas atmosphere including $N_2$ was not performed.

<<Mixing Step>>

The cBN powder having been through the plasma treatment and the binder phase source material powder having been through the plasma treatment were mixed by wet ball mill mixing under conditions described in each of Tables 1-1 and 1-2, thereby obtaining a powder mixture. On this occasion, a volume-based ratio of the content ratio of the cBN powder in the powder mixture and the content ratio of the binder phase source material powder was adjusted to be the same as a ratio of the content ratio of the cubic boron nitride grains [volume %] described in each of Tables 2-1 and 2-2 and the content ratio of the binder phase [volume %] described in each of Tables 2-1 and 2-2. It should be noted that when numerical values are described in both the column "Large-Diameter Ball" and the column "Small-Diameter Ball", it means that the large-diameter ball and the small-diameter ball were used simultaneously. When "-" is described in the column "Small-Diameter Ball", it means that the small-diameter ball was not used.

<<Sintering Step>>

First, as the first step, the powder mixture was introduced into a container and was vacuum-sealed. Next, as the second step, the vacuum-sealed powder mixture was sintered under conditions described in each of Tables 1-1 and 1-2 using an ultra-high temperature and high pressure apparatus, thereby obtaining a cubic boron nitride sintered material. It should be noted that regarding the first temperature increase, the temperature increase rate was 3° C./minute, and the temperature immediately after the first temperature increase was 1200° C. to 1300° C. On the other hand, regarding the second temperature increase, the temperature increase rate was 10° C./minute, and the temperature immediately after the second temperature increase was 1400° C. to 1550° C.

With the above procedure, each of the cubic boron nitride sintered materials according to samples 1 to 17 and 101 to 107 was produced.

Moreover, as conventional examples, a cubic boron nitride sintered material according to a sample 108 was prepared by the same production method as that for No. 1 of Example 1 of PTL 1, a cubic boron nitride sintered material according to a sample 109 was prepared by the same production method as that for invention product 1 of PTL 2, and a cubic boron nitride sintered material according to a sample 110 was prepared by the same production method as that for a polycrystalline cBN material according to Example 1 of PTL 3.

TABLE 1-1

| | Pretreatment Step | | Mixing Step | | | Sintering Step | |
|---|---|---|---|---|---|---|---|
| Sample No. | Ar Gas Exposure Time [Minute] | $N_2$ Gas Exposure Time [Minute] | Large-Diameter Ball Diameter [mm] | Small-Diameter Ball Diameter [mm] | M2/M1 | Whether to Perform First Temperature Increase | Whether to Perform Second Temperature Increase |
| 1 | 30 | 30 | 7 | 2 | 0.35 | Performed | Performed |
| 2 | 30 | 30 | 7 | 2 | 0.35 | Performed | Performed |
| 3 | 20 | 20 | 3 | 2 | 0.35 | Performed | Performed |
| 4 | 30 | 30 | 7 | 2 | 0.35 | Performed | Performed |
| 5 | 30 | 30 | 7 | 2 | 0.35 | Performed | Performed |
| 6 | 30 | 30 | 7 | 2 | 0.35 | Performed | Performed |
| 7 | 30 | 30 | 7 | 2 | 0.35 | Performed | Performed |
| 8 | 30 | 30 | 7 | 2 | 0.35 | Performed | Performed |
| 9 | 30 | 30 | 7 | 2 | 0.35 | Performed | Performed |
| 10 | 30 | 30 | 7 | 2 | 0.35 | Performed | Performed |
| 11 | 30 | 30 | 7 | 2 | 0.35 | Performed | Performed |
| 12 | 30 | 30 | 7 | 2 | 0.35 | Performed | Performed |
| 13 | 30 | 30 | 7 | 2 | 0.35 | Performed | Performed |
| 14 | 30 | 30 | 7 | 2 | 0.35 | Performed | Performed |
| 15 | 30 | 30 | 7 | 2 | 0.35 | Performed | Performed |
| 16 | 30 | 30 | 7 | 2 | 0.35 | Performed | Performed |
| 17 | 40 | 40 | 8 | 1 | 0.35 | Performed | Performed |

TABLE 1-2

| | Pretreatment Step | | Mixing Step | | | Sintering Step | |
|---|---|---|---|---|---|---|---|
| Sample No. | Ar Gas Exposure Time [Minute] | $N_2$ Gas Exposure Time [Minute] | Large-Diameter Ball Diameter [mm] | Small-Diameter Ball Diameter [mm] | M2/M1 | Whether to Perform First Temperature Increase | Whether to Perform Second Temperature Increase |
| 101 | 30 | 30 | 7 | 2 | 0.35 | Performed | Performed |
| 102 | 30 | 30 | 7 | 2 | 0.35 | Performed | Performed |
| 103 | 30 | 30 | 7 | 2 | 0.35 | Performed | Not Performed |
| 104 | 0 | 0 | 7 | 2 | 0.35 | Performed | Performed |
| 105 | 30 | 30 | 3 | — | 0 | Performed | Performed |
| 106 | 30 | 30 | 7 | 2 | 0.35 | Performed | Performed |
| 107 | 30 | 30 | 7 | 2 | 0.35 | Performed | Performed |

TABLE 2-1

| | cBN Grains | | | Binder Phase | | cBN Grain Content Ratio + Binder Phase | |
|---|---|---|---|---|---|---|---|
| Sample No. | Content Ratio [Volume %] | Z | d [μm] | Content Ratio [Volume %] | Composition Compound | Content Ratio [Volume %] | Life [m] |
| 1 | 40 | 0.24 | 1 | 60 | TiN, $TiB_2$, $Al_2O_3$, AlN | 100 | 2070 |
| 2 | 80 | 0.21 | 1 | 20 | TiN, $TiB_2$, $Al_2O_3$, AlN | 100 | 2070 |
| 3 | 60 | 0.25 | 1 | 40 | TiN, $TiB_2$, $Al_2O_3$, AlN | 100 | 2070 |
| 4 | 60 | 0.24 | 0.1 | 40 | TiN, $TiB_2$, $Al_2O_3$, AlN | 100 | 2070 |
| 5 | 60 | 0.24 | 3 | 40 | TiN, $TiB_2$, $Al_2O_3$, AlN | 100 | 2070 |
| 6 | 60 | 0.23 | 2 | 40 | TiN, $TiB_2$, $Al_2O_3$, AlN | 100 | 2415 |
| 7 | 60 | 0.22 | 1 | 40 | TiN, $TiB_2$, $Al_2O_3$, AlN | 100 | 2760 |
| 8 | 70 | 0.22 | 1 | 30 | TiN, $TiB_2$, $Al_2O_3$, AlN | 100 | 2415 |
| 9 | 59 | 0.22 | 1 | 40 | TiN, $TiB_2$, $Al_2O_3$, AlN | 99 | 2760 |
| 10 | 60 | 0.23 | 1 | 40 | ZrN, $ZrB_2$, $Al_2O_3$, AlN | 100 | 2070 |
| 11 | 60 | 0.22 | 1 | 40 | HfN, $Al_2O_3$, AlN | 100 | 2070 |
| 12 | 60 | 0.21 | 1 | 40 | TiCN, $TiB_2$, $Al_2O_3$, AlN | 100 | 2415 |
| 13 | 60 | 0.21 | 1 | 40 | TiNbCN, $TiB_2$, $Al_2O_3$, AlN | 100 | 2415 |
| 14 | 60 | 0.24 | 1 | 40 | TiN, $TiB_2$ | 100 | 2070 |

TABLE 2-1-continued

| Sample No. | cBN Grains Content Ratio [Volume %] | cBN Grains Z | cBN Grains d [μm] | Binder Phase Content Ratio [Volume %] | Binder Phase Composition Compound | cBN Grain Content Ratio + Binder Phase Content Ratio [Volume %] | Life [m] |
|---|---|---|---|---|---|---|---|
| 15 | 60 | 0.22 | 1 | 40 | TiN, $TiB_2$, AlN | 100 | 2415 |
| 16 | 60 | 0.21 | 1 | 40 | TiN, $TiB_2$, $Al_2O_3$ | 100 | 2415 |
| 17 | 60 | 0.1 | 1 | 40 | TiN, $TiB_2$, $Al_2O_3$, AlN | 100 | 3105 |

TABLE 2-2

| Sample No. | cBN Grains Content Ratio [Volume %] | cBN Grains Z | cBN Grains d [μm] | Binder Phase Content Ratio [Volume %] | Binder Phase Composition Compound | cBN Grain Content Ratio + Binder Phase Content Ratio [Volume %] | Life [m] |
|---|---|---|---|---|---|---|---|
| 101 | 30 | 0.22 | 1 | 70 | TiN, $TiB_2$, $Al_2O_3$, AlN | 100 | 1035 |
| 102 | 85 | 0.22 | 1 | 15 | TiN, $TiB_2$, $Al_2O_3$, AlN | 100 | 1380 |
| 103 | 60 | 0.27 | 1 | 40 | TiN, $TiB_2$, $Al_2O_3$, AlN | 100 | 1725 |
| 104 | 60 | 0.33 | 1 | 40 | TiN, $TiB_2$, $Al_2O_3$, AlN | 100 | 1725 |
| 105 | 60 | 0.29 | 1 | 40 | TiN, $TiB_2$, $Al_2O_3$, AlN | 100 | 1725 |
| 106 | 60 | 0.22 | 0.04 | 40 | TiN, $TiB_2$, $Al_2O_3$, AlN | 100 | 1035 |
| 107 | 60 | 0.22 | 5 | 40 | TiN, $TiB_2$, $Al_2O_3$, AlN | 100 | 1380 |
| 108 | 57 | 0.42 | 0.9 | 43 | TiN, $TiB_2$, $AlB_2$, $Al_2O_3$, AlN, WC | 100 | 1725 |
| 109 | 50 | 0.38 | 0.2 | 50 | TiN, $TiB_2$, $Al_2O_3$, AlN | 100 | 1380 |
| 110 | 80 | 0.39 | 1.3 | 20 | TiN, TaN | 100 | 1725 |

<<Evaluation on Properties of Cubic Boron Nitride Sintered Material>>

<Composition of Cubic Boron Nitride Sintered Material>

For the cubic boron nitride sintered material according to each of the samples, the content ratio [volume %] of the cubic boron nitride grains was found by the method described in the first embodiment. Obtained results are shown in the column "Content Ratio [Volume %]" of the column "cBN Grains" of each of Tables 2-1 and 2-2. Further, for the cubic boron nitride sintered material according to each of the samples, the content ratio [volume %] of the binder phase was found by the method described in the first embodiment. Obtained results are shown in the column "Content Ratio [Volume %]" of the column "Binder Phase" of each of Tables 2-1 and 2-2. Further, for the cubic boron nitride sintered material according to each of the samples, the total content ratio [volume %] of the cubic boron nitride grains and the binder phase was found by the method described in the first embodiment. Obtained results are shown in the column "cBN Grain Content Ratio+Binder Phase Content Ratio [Volume %]" of each of Tables 2-1 and 2-2. It should be noted that for the cubic boron nitride sintered material according to each of the samples, the sum of the volume of the compound described in the column "Composition" of the column "Binder Phase" of each of Tables 2-1 and 2-2 and the volume of an impurity other than the compound was 100% with respect to the volume of the binder phase.

<Variation Coefficient Z of Area Ratio of Cubic Boron Nitride Grains>

For the cubic boron nitride sintered material according to each of the samples, variation coefficient Z of the area ratio of the cubic boron nitride grains in the cross section of the cubic boron nitride sintered material was found by the method described in the first embodiment. Obtained results are shown in the column "Z" of the column "cBN Grains" of each of Tables 2-1 and 2-2.

<Average Grain Size d of Cubic Boron Nitride Grains>

For the cubic boron nitride sintered material according to each of the samples, average grain size d of the cubic boron nitride grains was found by the method described in the first embodiment. Obtained results are shown in the column "d [μm]" of the column "cBN Grains" of each of Tables 2-1 and 2-2.

<Composition of Binder Phase>

For the cubic boron nitride sintered material according to each of the samples, the composition of the binder phase was found by the method described in the first embodiment. Obtained results are shown in the column "Compound" of the column "Composition" of the column "Binder Phase" of each of Tables 2-1 and 2-2.

<<Cutting Test>>

A cutting tool (shape: CNGA120408) was produced using the cubic boron nitride sintered material according to each of the samples. A cutting test was performed using the cutting tool under the following cutting conditions. It should be noted that the following cutting conditions correspond to strong intermittent cutting. A cutting edge thereof was observed every 345 m of a cutting distance so as to check whether or not breakage of the cutting edge took place. A cutting distance at the time at which breakage of 0.2 mm or more took place was measured, and this cutting distance was regarded as the life of the cutting tool. Obtained results are shown in the column "Life [km]" of each of Tables 2-1 and 2-2. When the life of the cutting tool is 2,000 m or more, it means that the tool life is excellent.

(Cutting Conditions)

Cutting rate: 100 m/min.

Feed rate: 0.2 mm/rev.

Depth of cut: 0.2 mm

Coolant: DRY

Cutting method: strong intermittent cutting

Lathe: LB400 (provided by Okuma Corporation)

Workpiece: hardened steel (SCM415 U-groove, hardness HRC60)

Each of the cubic boron nitride sintered materials according to samples 1 to 17 corresponds to an example of the present disclosure. Each of the cubic boron nitride sintered materials according to samples 101 to 110 corresponds to a comparative example. In view of the results in Tables 2-1 and 2-2, it was found that each of the cubic boron nitride sintered materials according to samples 1 to 17 could allow for a long life of a tool even when particularly used as a material of a cutting tool for strong intermittent cutting, as compared with each of the cubic boron nitride sintered materials according to samples 101 to 110. Moreover, in view of the results of Table 2-2, it was confirmed that the cubic boron nitride sintered material of the present application could not be obtained by the method of producing the cubic boron nitride sintered material in each of PTL 1 to PTL 3.

In view of the above description, it was found that each of the cubic boron nitride sintered materials according to samples 1 to 17 could allow for a long life of a cutting tool even when particularly used as a material of a cutting tool for strong intermittent cutting.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

R1 unit region.

The invention claimed is:

1. A cubic boron nitride sintered material comprising: 40 volume % or more and 80 volume % or less of cubic boron nitride grains; and 20 volume % or more and 60 volume % or less of a binder phase, wherein an average grain size d of the cubic boron nitride grains is 0.1 μm or more and 3 μm or less, the binder phase includes at least one selected from a second group consisting of one element selected from a first group consisting of a group 4 element, a group 5 element, a group 6 element in a periodic table, and aluminum, an alloy consisting of two or more elements selected from the first group, and an intermetallic compound consisting of two or more elements selected from the first group, or at least one selected from a fourth group consisting of a first compound and a solid solution originated from the first compound, the first compound consisting of at least one element selected from the first group and at least one element selected from a third group consisting of nitrogen, carbon, boron, and oxygen, in a cross section of the cubic boron nitride sintered material, a variation coefficient Z of an area ratio of the cubic boron nitride grains is 0.25 or less, and the variation coefficient Z is obtained by providing 260 unit regions in total in an image obtained through binarization processing on a reflected electron image obtained by imaging the cross section of the cubic boron nitride sintered material at a magnification of 5,000 times with a scanning electron microscope, calculating a standard deviation of respective area ratios of the cubic boron nitride grains in the unit regions and an average of the area ratios based on the 260 unit regions in total, and dividing the standard deviation by the average, each of the unit regions having a square shape with each side having a length twice as large as the average grain size d of the cubic boron nitride grains.

2. The cubic boron nitride sintered material according to claim 1, wherein the average grain size d of the cubic boron nitride grains is 0.1 μm or more and 2 μm or less.

3. The cubic boron nitride sintered material according to claim 1, wherein a content ratio of the cubic boron nitride grains in the cubic boron nitride sintered material is 60 volume % or more and 70 volume % or less, and a content ratio of the binder phase in the cubic boron nitride sintered material is 30 volume % or more and 40 volume % or less.

4. The cubic boron nitride sintered material according to claim 1, wherein the binder phase includes at least one selected from a group consisting of titanium nitride, titanium boride, aluminum nitride, and aluminum oxide.

5. The cubic boron nitride sintered material according to claim 1, wherein a total content ratio of the cubic boron nitride grains and the binder phase in the cubic boron nitride sintered material is 99 volume % or more.

6. A tool comprising the cubic boron nitride sintered material according to claim 1.

7. The cubic boron nitride sintered material according to claim 1, wherein, in the image obtained through binarization processing on the reflected electron image, the unit regions are continuously arranged along a first direction and a direction orthogonal to the first direction.

* * * * *